Feb. 26, 1963 W. ROWE 3,078,510
METHOD OF AND APPARATUS FOR MAKING DECORATIVE
SURFACE COVERING SHEETS
Filed Feb. 16, 1956 2 Sheets-Sheet 2
Fig. 2
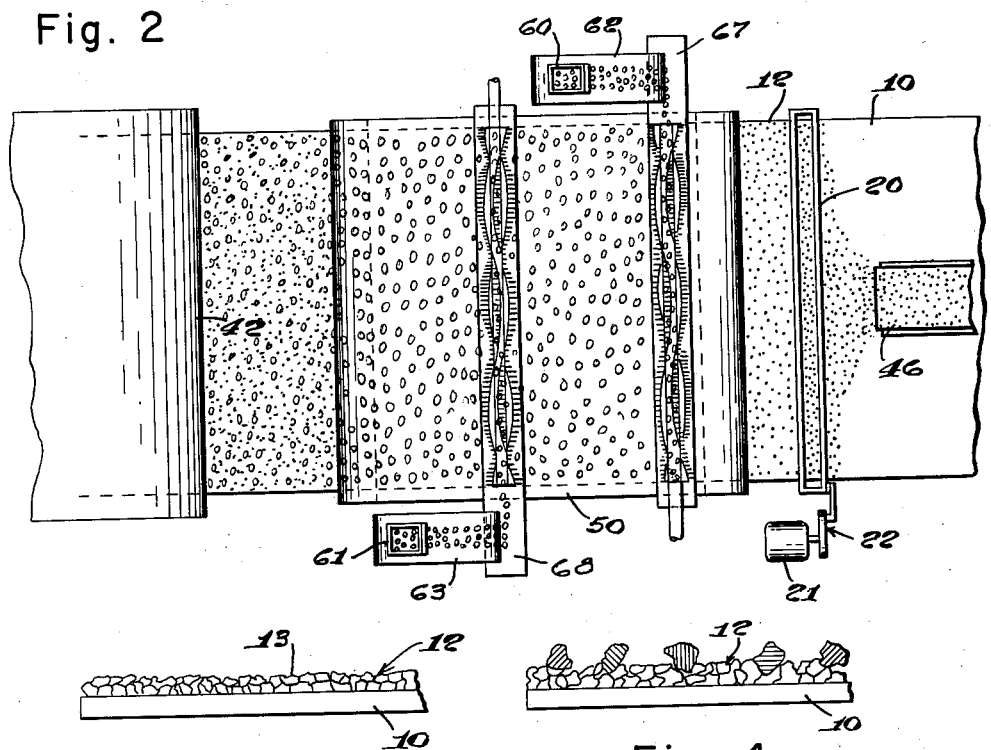
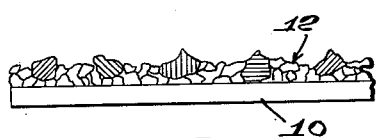
Fig. 3
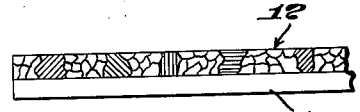
Fig. 4
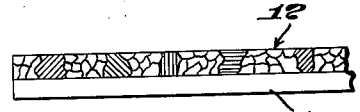
Fig. 5
Fig. 6
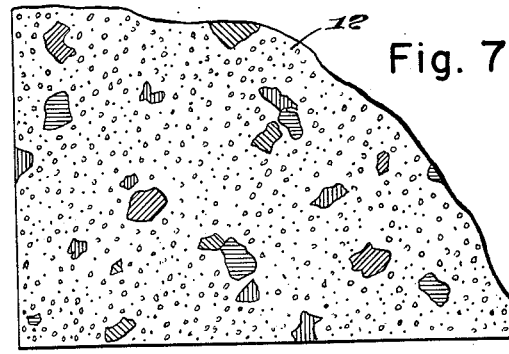
Fig. 7
INVENTOR.
William Rowe
BY
J. Stanley Churchill.
ATTORNEY

United States Patent Office 3,078,510
Patented Feb. 26, 1963

3,078,510
METHOD OF AND APPARATUS FOR MAKING DECORATIVE SURFACE COVERING SHEETS
William Rowe, Lewiston, Maine, assignor to Bonafide Mills, Inc., Lisbon, Maine, a corporation of Maine
Filed Feb. 16, 1956, Ser. No. 566,043
4 Claims. (Cl. 18—11)

This invention relates to a method of and to apparatus for making a decorative surface covering sheet which is particularly useful as a wall or floor covering.

One object of the invention is to provide a novel method of producing a surface covering sheet in the nature of a linoleum characterized by an inlaid scatter pattern and by which such a surface covering sheet may be manufactured in a rapid, economical and practical manner.

A further object of the invention is to provide novel and efficient apparatus for economically producing the present surface covering sheet, preferably in a continuous, economical and practical manner.

With these general objects in view and such others as may hereinafter appear, the invention consists in the method of and apparatus for producing the decorative surface covering sheet having the inlaid scatter pattern, hereinafter described and particularly defined in the claims at the end of this specification.

In the drawings:

FIG. 2 is a plan of the central portion of the apparatus shown in FIG. 1;

FIGS. 3, 4, 5 and 6 are vertical sectional details of the present surface covering sheet illustrating successive steps in the production thereof; and FIG. 7 is a plan of a portion of a decorative surface covering sheet produced in accordance with the invention.

Figure 1:
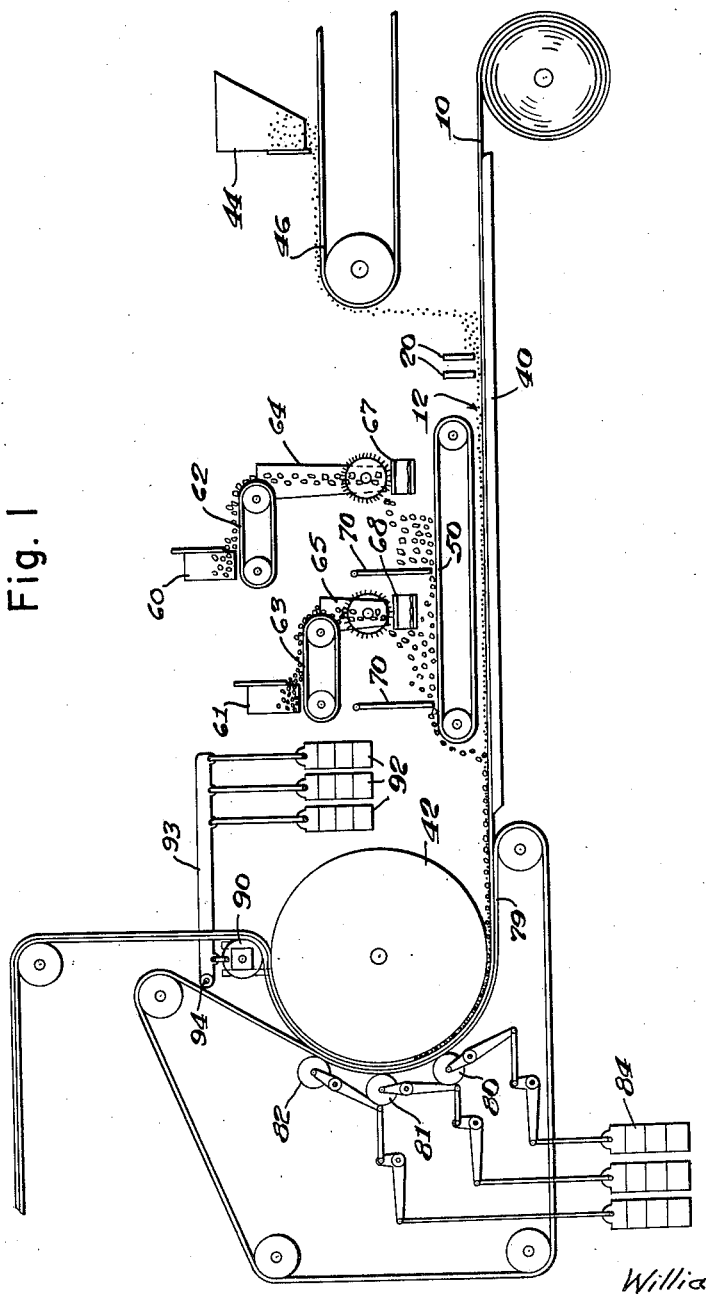
FIG. 1 is a side elevation of the preferred form of apparatus for producing the present decorative surface covering sheet.

In its broader aspects the invention contemplates a method of producing the present inlaid scatter pattern by the distribution of pattern forming pellets of a thermoplastic composition over the surface of a thermoplastic layer constituting the wear resisting layer of the surface covering sheet and then subjecting the pellets to pressure and heat to impress the pellets down in the wear resisting layer and to subsequently bond the pellets into the layer. The pellets are of such a character as to substantially retain their physical shape and size during the initial stages of the application of the pressure thereto so that they are forced down into the wear resisting layer without loss of their identity, and thus insure the ultimate production of a predetermined scatter pattern. Preferably, in its commercial form the present method contemplates the advancement of a backing web in a substantially horizontal plane and the application thereto in granular form of a thermoplastic composition providing a layer of substantially uniform thickness and which when subsequently subjected to heat and pressure forms the wear resisting layer of the surface covering sheet and into which the scatter pattern is inlaid, as will be described. This composition may and preferably will be pigmented, and the granules may and preferably may be of the usual size now utilized in the production of the various commercial brands of inlaid linoleum. The method further contemplates the distribution over the surface of the aforesaid granular layer of a large number of randomly applied pellets of a size substantially larger than the size of the granules going into the production of the base layer, and preferably these pellets are of a thermoplastic composition substantially heavier and of a relatively dense nature such that during the initial part of the application of pressure to the upper surface of such pellets as they rest upon the surface of the granular base layer, the pellets are pressed into the base layer without loss of identity, effecting lateral displacement of the granules and forming a composite layer in which the pellets are inlaid into the granular layer. Continued application of heat and pressure effects softening of both the granules of the base layer and the inlaid pellets with the result that both are thoroughly bonded to one another and to the backing to provide the latter with a strong, wear resisting layer. The decorative sheet thus produced may be further cured in accordance with usual practice and in the usual curing stoves.

The invention also contemplates novel apparatus by which the present decorative surface covering sheet may be efficiently produced in accordance with the foregoing method as will be described.

Referring now to the drawings illustrating apparatus for practicing the preferred form of method, 10 represents a backing or foundation sheet upon which a granular thermoplastic layer 12, which will be hereinafter referred to as the "background layer," may be produced in any usual or preferred manner following the general procedure at present employed in the manufacture of inlaid linoleum. The granules 13 of linoleum or equivalent composition may be produced and pigmented in accordance with prior practice including the production of any preferred binder, such as oleoresinous binder, a gelled linseed oil binder, or binders produced by other siccative oil gels oxidized in any usual apparatus, such as a modified Bedford kettle, and such a binder is filled and pigmented and worked into a uniform mixture by the operation of any usual or preferred form of mixing apparatus, such as a Banbury mixer. Thereafter the filled and pigmented binder composition is then fed into a disintegrator of any usual or preferred form to be converted into granules, and one form of suitable disintegrator may consist of two cages, one driven inside the other and rotated in opposite directions at a high speed. The pigmented and filled binder composition is fed into the inner cage, and the high speed shatters the composition into very small granules of the general size and character which have heretofore been used in the production of inlaid linoleum. In producing the granulated thermoresponsive base layer 12 it is preferred to produce the different colored granules separately and to subsequently blend them if desired to produce the desired color blend so that the background layer, indicated at 12, of the surface covering sheet may have a predetermined color and appearance. This background layer may be of one color or may be of a blend of a series of different colored individual granules imparting to the background an appearance similar in some degree to the appearance which might be produced by the application of fine different colored confetti. The effect produced by the use of a plurality of colored particles in producing the background surface may approach a blend of any predetermined color, such for example as red, green, yellow or blue, and other background effects may include black or white.

In producing the foundation layer, instead of using the conventional stencilling equipment or stencil openings or screens used in conventional machines for producing inlaid linoleum to apply the plurality of colors on the sheet, in accordance with the present invention the granules are fed behind one or more oscillating bars 20 which will be hereinafter referred to as stricklers. The strickler bars 20 may be driven from a motor 21 through an eccentric connection 22. The oscillating strickler bars may and preferably will be provided with micrometer adjustments (not shown) at each side of the sheet to enable accurate adjustment of the height of the undersurface of the bar from the sheet so that the desired thickness of granular layer may be produced over the surface of the sheet as the sheet travels under the bar and the bar is reciprocated.

In order to prevent the colored particles from sticking together and permit free flow (similar to dry sand) a small percentage of talc or similar material is added to the blended colored granules. It has been found that approximately 1 to 5% talc based on the compound is desirable. It is also desirable to add the talc to the blended color granules as shortly before they are applied to the base sheet as practical.

A typical formula for producing granules for the foundation layer is as follows:

|  | Lbs. |
|---|---|
| Binder | 200–400 |
| Wood flour | 200–500 |
| Whiting | 300–0 |
| Pigments (white and colored pigments) | 20–100 |

A preferred formula is as follows:

|  | Lbs. |
|---|---|
| Binder | 335 |
| Wood flour | 400 |
| Whiting | 100 |
| Pigment | 40 |

In practicing the method of producing the inlaid surface covering sheet embodying the present invention the pigmented and filled pellets 14 are first prepared of a thermoplastic composition which is capable of bonding when subjected to heat and pressure with the thermoplastic granules 13 constituting the granular layer 12 upon the backing sheet 10. The pellets are of a size substantially larger than the size of the granules constituting the granular foundation layer and are preferably produced in a manner such as to impart to them greater density and hardness than the smaller granules of the foundation layer so that when these pellets have been distributed onto the surface of the foundation layer in accordance with the present method, as will be described, and the composite sheet is subjected to heat and pressure, the relatively heavy and dense pellets may be forced without substantial deformation into the relatively easily displaced granular layer of the foundation member during the initial part of the pressing operation until the upper surface of the pellets are nearly even or flush with the surface of the granular layer.

In practice the granules of the foundation layer preferably vary in size from about 1/8 of an inch maximum dimension down to a fine powder, while preferably the pellets range from about 5/8 of an inch maximum dimension down to about 3/8 of an inch.

While any known or preferred thermoplastic or thermoresponsive binders may be used for the production of the granules and of the pellets, preferably any of the foregoing formulas may be used for both granules and pellets.

In producing the pellets the relative portion of whiting or other filler may be substantially increased with relation to the proportion of binder employed and the proportion of wood flour substantially decreased as compared with the proportions in the formulations above set forth for the production of the granules.

In accordance with the preferred method of making the pellets the procedure involves the production of the binder following the procedure above outlined in connection with the production of the granules of the foundation layer, and after the binder has been produced it is preferably placed in a mixing apparatus, such as a Banbury mixer where it is combined with the fillers and pigments and worked into a uniform mass by the operation of the mixers. This material may then be fed into roll mixers and to a disintegrator of any usual or preferred form, such for example as one comprising two cages, one driven inside the other, and which are rotated in opposite directions at a high rate of speed. The binder composition is fed into the inner cage, and the high speed shatters the composition into granules. After cooling the granules are screened, and those coming within the range of an approximate size of from 3/8 to 5/8 inch in rough diameter are then subjected to a tumbling operation in any usual or preferred form of tumbling apparatus until the density of the pellets thus formed is substantially greater than that of the granules of which the foundation layer is formed, and the pellets assume characteristics which enable them to resist substantial deformation during the initial heating and pressing operation to thereby enable them to be inlaid into the displaceable granular layer.

It is essential for the most successful operation of the present process that the pellets thus formed be of a character such as to resist individual compression during the operation of pressing them into the granular layer of the foundation and at the temperature to which the pellets are exposed during this pressing operation. As a general indication these pellets should be self-sustaining and possess the ability to act as a substantially rigid incompressible particle when subjected to the pressing operation at temperatures of 100° F. or below.

Referring now to FIG. 1 of the drawings, in the apparatus more or less diagrammatically illustrated therein the backing sheet may comprise paper, treated or untreated felt and textile fabrics, such as cotton or burlap, plastic, rubber or rubberlike sheet material or any other suitable backing to which a wear resisting layer may be bonded, and the treated felt may be saturated with any one of a number of saturants including asphalt, and if desired a smoothing coat may be applied of a heat and pressure sensitive composition as is known in the art, and if desired a sticky coat may be applied as a facing coat over the backing to improve the bond of the granules to the felt. The backing sheet in roll form is guided over a suitable supporting platform 40 in a generally horizontal plane and then conducted around a heated drum 42 of substantial diameter. During the passage of the backing roll over the platform 40 granules for the production of the granular foundation layer may be applied from a supply hopper 44 and by a belt 46 onto the surface of the backing sheet, and a substantially uniform granular layer is formed by the strickler bars 20. After the application of the granular layer the sheet in this condition is as shown in section in FIG. 3. The backing sheet with the granular layer thereon then travels under a distribution belt 50 which is disposed a short distance above the surface of the granular layer, and preformed pellets are supplied from one or more metering hoppers 60, 61 onto belts 62, 63 where they are fed in a substantially uniform stream into conveyor chutes 64, 65 down onto the upper surface of randomly travelling belts 67, 68. These belts are preferably grooved belts, and sinuously shaped brushes serve to gently brush the pellets onto the upper surface of the distribution belt 50 where they are carried forward under gauging bars 70 and fall gently in a randomly disposed relationship on the surface of the granular layer. The condition of the pellets and the granules are more a less as shown in section in FIG. 4 at the point in the operation of the process and apparatus shortly after the pellets have been gently deposited on the surface of the granular layer as they leave the belt 50. The metering hoppers, the speed of the belts 62, 63 and the speed of the belts 67, 68 together with the speed of the sinuously shaped brushes control the rate at which the pellets are discharged from the belt 50 so that in practice it is possible to obtain wide variations in the ultimate scatter pattern produced by the pellets. It will be understood that when it is desired to utilize a series of different colored pellets a series of metering hoppers and associated parts will be provided.

After the application of the pellets being discharged from the upper run of the belt 50 the backing sheet is then conducted around the heated drum 42 with the pellets in engagement with the heated surface of the drum. The undersurface of the backing sheet is engaged by a belt 79 having some degree of resilience, as a rubber belt or a canvas belt, and the belt 79 is conducted around a portion of the heated drum substantially in the manner as indicated, and during the initial travel of the backing sheet around the drum pressure is exerted against the underfacing of the backing sheet by pressure rollers 80, 81, 82 connected by suitable levers and linkage to counterweights 84 and by which the counterweight for each roll is multiplied until a substantial pressure is exerted upon the backing sheet to press the pellets and granular layer against the heated drum, and during this initial heating and pressing operation the position of the pellets assumes generally that shown in FIG. 5, with the pellets slightly projecting above the surface of the granular layer. This condition obtains by reason of the resiliency of the belt 79. The belt 79 leaves contact with the surface of the backing sheet shortly after passage of both past the last presser roll 82, and thereafter the backing sheet, the granular layer and inlaid pellets are conducted around additional non-resilient presser roll 90, the function of which is to further press the pellets down into the granular layer so that in section the pellets asume the position shown in FIG. 6 with the upper surface of the pellets substantially flush with the surface of the granular layer. During the passage of the sheet around the heated drum the granules and pellets are gradually heated to the point where the application of the pressure by the presser rolls 80, 81, 82 finally effects thorough bonding of the granules and pellets to one another and of both to the backing sheet, thus producing a wear resisting layer on the backing sheet having a smooth surface and of an appearance such as is illustrated in FIG. 7 with the upper surface of the pellets forming a scatter pattern. The presser roll 90 is pressed against the heated roll by counterweights 92 hung on a lever 93 pivoted at 94. After the sheet has left the presser roll 90 it is conducted over suitable guide rolls to the usual stoves where it is looped and subjected to the usual curing operation as now commonly practiced in the production of inlaid linoleum.

Having thus described the invention what is claimed is:

1. In the method of making a surface covering sheet having an inlaid decorative scatter pattern, the steps comprising applying to a backing sheet a loosely dispersed foundation layer of pigmented thermoplastic granules, randomly distributing over the granular foundation layer a large number of individual pellets of a pigmented thermoplastic composition, said pellets being of substantially greater size than the granules of the foundation layer, being of a size substantially equal to the thickness of said foundation layer and of substantially greater hardness and density, then subjecting the composite sheet of loosely dispersed granules and pellets to heat and pressure forcing the pellets into and through the granular foundation layer and effecting lateral displacement of the granules during said pressing operation, continuing the application of heat and pressure until the pellets and granules are softened and bonded to one another and then curing the thermoplastic composition while maintaining the individual identity of the pellets.

2. In the method of making a surface covering sheet having an inlaid decorative scatter pattern, the steps comprising advancing a backing web and applying thereto a non-compacted foundation layer of substantially uniform thickness of pigmented thermoplastic granules, then gently brushing a series of pellets, each of a pigmented thermoplastic composition and of greater size, hardness and density than the granules, on top of and randomly distributed over the surface of the granular foundation layer, said pellets being of a size substantially equal to the thickness of said foundation layer, then conducting the sheet around a portion of the surface of a heated drum and between the drum and a resilient belt, applying substantial pressure to the surface of the resilient belt at successive intervals in the travel of the composite sheet around the drum to force said pellets into and through said foundation layer, and subsequently curing the sheet, the identity of the individual pellets being maintained during the formation of the sheet.

3. In the method as defined in claim 2, the additional step which consists in applying non-resilient pressure directly to the back of the backing web to press the granules and pellets against the heated drum and thereby produce a smooth surfaced decorative sheet.

4. In an apparatus for producing a surface covering sheet having an inlaid decorative scatter pattern, in combination, means for supporting and advancing a backing sheet in a substantially horizontal plane, means for applying and forming on the sheet as it is advanced a layer of substantially uniform thickness comprising loose granules of a pigmented thermoplastic composition, means for applying and randomly distributing in spaced relation a large number of individual pellets over the surface of said granular layer, each pellet being of a size substantially greater than and denser than the previously applied granules, a heated drum, a belt having some resiliency mounted to encompass a portion of the heated drum, means for directing the composite sheet with the applied granules and pellets between the belt and the heated drum and with the backing sheet in contact with the belt, a series of presser rolls distributed around the drum and engaging the belt operating to effect the initial pressing of the pellets into the loose granular layer and to subsequently heat and press the granules and pellets to bond them to the backing layer and to one another to form the wear resisting decorative layer for the backing sheet, and a non-resilient presser roll directly engaging the backing sheet after it has left the belt for completing the pressing and bonding operation and for imparting a smooth surface to the wear resisting decorative layer.

References Cited in the file of this patent

UNITED STATES PATENTS

| | | |
|---|---|---|
| 1,001,836 | Fritz | Aug. 29, 1911 |
| 1,925,282 | Robinson | Sept. 5, 1933 |
| 1,975,515 | Mayer | Oct. 2, 1934 |
| 2,548,029 | Kurtz et al. | Apr. 10, 1951 |
| 2,603,575 | Schramm | July 15, 1952 |
| 2,668,787 | Schramm | Feb. 9, 1954 |
| 2,694,831 | Benedict | Nov. 23, 1954 |
| 2,775,994 | Rowe | Jan. 1, 1957 |